Jan. 23, 1968  R. D. TRUCKLE  3,364,791
DIFFERENTIALS

Filed June 8, 1965  3 Sheets-Sheet 2

INVENTOR.
Robert D. Truckle,
BY Parker & Carter
Attorneys.

United States Patent Office 3,364,791
Patented Jan. 23, 1968

3,364,791
DIFFERENTIALS
Robert D. Truckle, Oshkosh, Wis., assignor to Oshkosh Truck Corporation, a corporation of Wisconsin
Filed June 8, 1965, Ser. No. 462,286
11 Claims. (Cl. 74—711)

ABSTRACT OF THE DISCLOSURE

A differential which drives a pair of axles directly from a power source when one axle has greater traction than the other, said differential including a pinion assembly carried by a differential casing for rotation therewith, a pair of side gears in engagement with the pinion assembly and rotatable with respect to each other and to the casing, and means for connecting each side gear to an associated axle. In addition, the structure of said differential defines a slide way for said pinion assembly allowing it to float within the differential casing enabling power to be transferred from gear to gear at the desired power transfer point. Further, when said differential is subjected to an unbalanced thrust of a predetermined magnitude both side gears will lock to the casing and pinion assembly for rotation therewith thereby transferring torque to whichever one of a pair of associated axles has greater traction.

---

This invention relates in general to differential mechanisms, and particularly to an automotive differential which, in addition to the usual functions of a differential, additionally transfers torque to whichever one of a pair of associated driven members has greater traction.

Accordingly, a primary object of this invention is to provide a differential particularly adapted for heavy duty applications which drives a pair of axles or shafts directly from the power source when one axle or shaft has greater traction than the other.

Yet another object is to provide a differential having a pinion gear and spider assembly which floats within the differential casing to thereby enable power to be transferred from gear to gear at the desired power transfer point irrespective of the difference in torque between the members driven by the gear assembly.

Yet another object is to provide a differential as above described which includes a plurality of steel inserts carried by the differential casing, one insert for each of the arms of the pinion gear spider, each insert having a slideway formed therein of a slightly greater length than the permitted distance of movement of the pinion gear assembly within the differential casing.

Yet a further object is to provide a differential of the type above described which may be substituted for the conventional differentials in existing vehicles without requiring alteration or modification of the differential carrier housing or other associated parts.

Yet another object is to provide a differential of the type above described in which the axial thrust forces generated in the differential acting in a direction to lock the differential are unaffected by the tooth contact forces of the pinion and side gear assembly.

Another object is to provide a differential of the type above described in which the points of transference of forces between the pinion and side gears in the pinion and side gear assembly remains substantially constant irrespective of the direction of thrust imposed on the assembly from traction forces whereby substantially no thrust forces are generated which act in opposition to the locking forces generated from the traction members.

Other objects and advantages will become apparent from reading the following description of the invention.

The invention is illustrated more or less diagrammatically in the accompanying figures wherein.

Like reference numerals will be used to refer to like parts throughout the following description of the invention.

Figure 1:
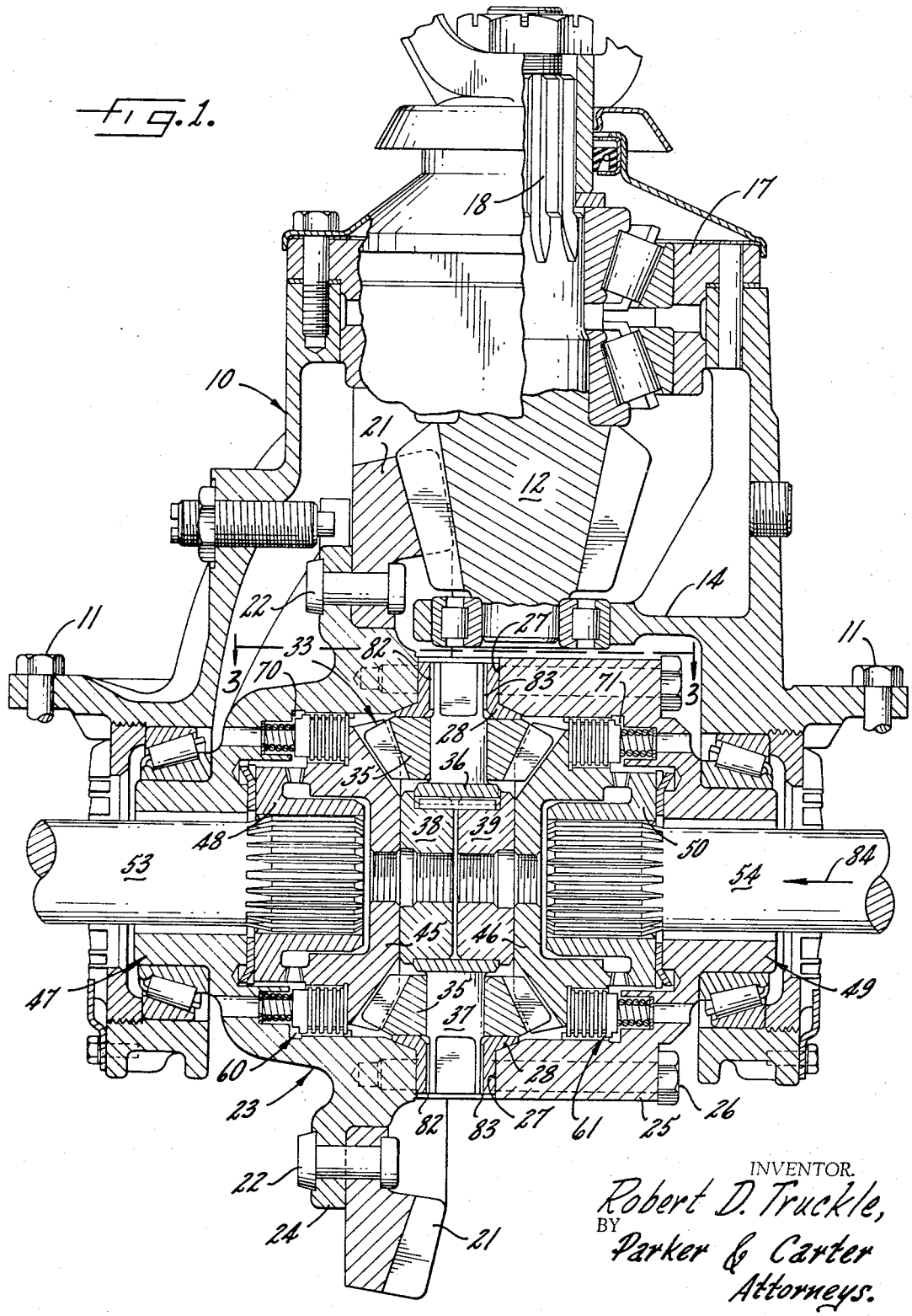
FIGURE 1 is a side elevation of a differential assembly embodying the invention.

A differential housing is indicated generally at 10 in FIGURE 1. The housing is connected in any suitable manner, as by bolts 11, to the axle housing or transfer case housing of an automotive vehicle so that the housing is fixed with respect to the vehicle.

A drive pinion is indicated at 12. The drive pinion is supported at its inner end by bearings carried in an extension 14 of the housing. The outer end of the drive pinion shaft is supported in bearings carried jointly by the outer end of the housing and the housing cover 17. Any suitable means, such as splines 18, connect the drive pinion 12 to the power transmission system which originates at a power source, such as the truck engine.

Drive pinion 12 is in driving engagement with ring gear 21. The ring gear is riveted or bolted, as at 22, to a differential casing indicated generally at 23. The casing consists essentially of two halves 24, 25 suitably connected by through bolts 26 or any other suitable means.

Figure 3:
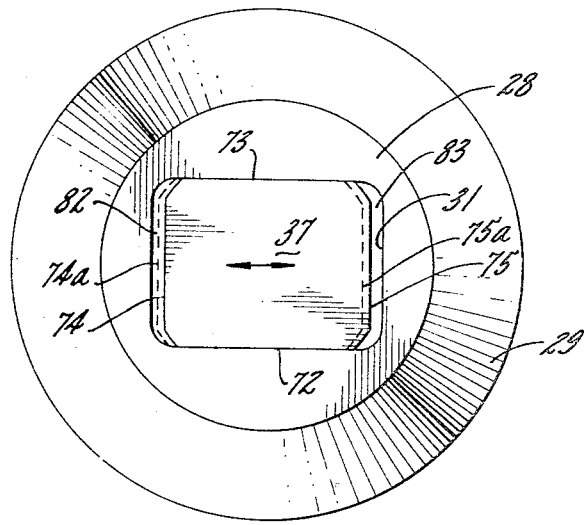
FIGURE 3 is a view to an enlarged scale, with parts omitted from clarity, taken substantially along the line 3—3 of FIGURE 1.
Figure 4:
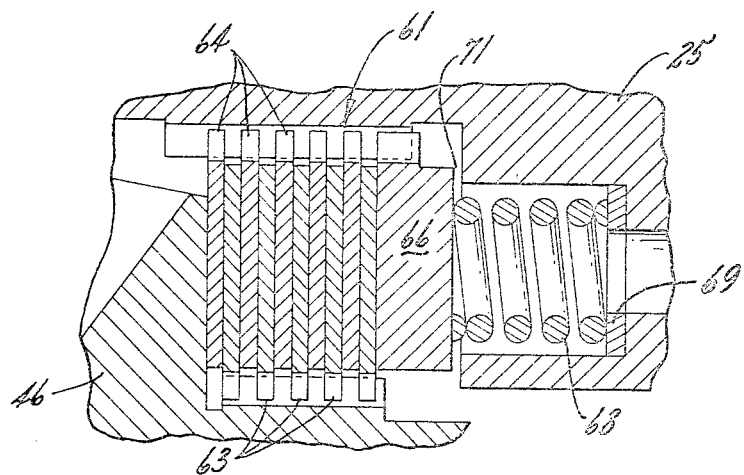
FIGURE 4 is a detailed view of a portion of FIGURE 1 to a greatly enlarged scale.

The casing 23 has a plurality of apertures 27 formed therein. A hardened steel insert 28 is nonrotatably located within each aperture 27. Each insert has a shank portion which terminates, at its radially innermost end, in a flange 29, the under surface 30 of which is smooth for purpose which will appear hereinafter. Each insert has a rectangularly shaped aperture 31 formed therein as is best seen in FIGURE 3.

A pinion gear assembly is indicated generally at 33. The pinion gear assembly includes a pinion gear carrier or spider 34 which supports a plurality of pinion gears 35. Most commonly, four pinion gears are employed. The spider 34 consists essentially of a tubular barrel portion 36 having outwardly projecting members 37, each of which carries a pinion gear. A pair of spacers or separators are indicated at 38 and 39, the separators having lips 40, 41 respectively, which bear against the associated ends of barrel or shank portion 36. The spacers do not quite meet when assembled, and are keyed to shank portion 36 for rotation therewith by a key 42.

Each of the pinion gears 35 engages side gears 45, 46. Each of the side gears forms the inner half of a thrust coupling assembly. Thus, the left thrust coupling assembly, indicated generally at 47, includes the side gear 45 as an inner member and an outer member 48. The outer end of the inner member and a mating end of the outer member each have formed thereon interfitting teeth which may, for example, have an included angle of 100°. Right thrust coupling assembly 49 likewise consists of side gear 46 as an inner member and an outer member 50, the inner and outer members having interengaging teeth disposed in the same relative and operative relationship as are the teeth on thrust coupling 47.

The inner bore of each of outer members 48, 50 has splines formed thereon as at 51, 52. These splines mate with corresponding splines formed on the innermost ends of driven members 53, 54 which, in this instance, are axles.

It will be understood, as is conventional in the art, that the driven members or axles are disposed in axial alignment with one another and, accordingly, the thrust couplings are disposed in axial alignment with one another.

A pair of bronze faced steel backed thrust washers are indicated at 55, 56.

The just described parts are so proportioned that the inner ends of the connecting halves 48, 50 of the thrust couplings terminate short of the internally recessed portions of the side gears. Further, the side gears are so proportioned as to butt against the separators 38 and 39.

A pair of clutch mechanisms are indicated generally at 60 and 61. The clutch mechanisms in this instance comprise annular clutch packs composed of a plurality of rings, alternate ones of which have splines formed thereon which mate with, alternately, corresponding splines formed on the casing 24 and the associated side gear. Those clutch rings which are internally splined are indicated at 63, and those which are externally splined are indicative at 64. The innermost clutch ring in each clutch pack bears against an annular shoulder on the back of each of side gears 45, 46. The outermost ring in each clutch pack is in pressure engagement with an associated pressure plate indicated at 65 and 66. A plurality of coil spring assemblies are indicated at 67, 68. There may for example be 12 or 16 compression springs per clutch pack. Each spring bottoms against a hardened washer 69 at one end and a pressure plate at the other end. The springs are so biased that in a normal inoperative position, such as that shown in FIGURE 1, the pressure plates 65 and 66 are spaced a short distance away from the casing, as indicated at 70 and 71. Belleville washers may be used in place of the coil springs 67, 68, but the washers are not easily adjusted to vary the total pre-load force on the pressure plates.

Each of the outwardly projecting spider arms 37 has two pairs of flats milled thereon disposed 90° from one another. As best seen in FIGURE 3, the longer, side flats 72, 73, are spaced apart a distance approximately equal to the width of the aperture 31 in insert 28. The end flats 74, 75 are spaced apart a distance substantially less than the long dimension of the generally rectangular shaped aperture 31. This enables the pinion member, and thereby the entire pinion gear assembly, to be axially reciprocable in the directions indicated by the arrow in FIGURE 3.

The use and operation of the invention are as follows:

The invention is best illustrated in conjunction with an assumed use with a pair of axle shafts in a piece of heavy equipment, such as an off highway truck, snow plow or transport vehicle.

Assume firstly that the vehicle is traveling down the road with equal traction under each of the wheels associated with axles 53, 54. In this condition power is transferred from the drive pinion 12 to ring gear 21. Rotation of ring gear 21 carries with it differential casing 23 to which the ring gear is bolted. Since the pinion gear assembly 33 is carried by casing 23, it likewise will rotate at the same speed as does casing 23. Power is transferred from the casing to the pinion spider 37, then to the four pinion gears 35 and then to the side gears 45, 46. If the forces in the system are balanced, power is transferred from the pinion gears to the side gears at points 80, 81.

Since the inner and outer halves 45, 48 and 46, 50 of thrust couplings 47, 49 are rotatable one with the other, they will be rotated at the same rate of speed as casing 23. Since the outer members 48, 50 of the thrust couplings are splined to the driven axles 53, 54, each axle will turn in the same direction at the same rate of speed.

In this condition the clutch mechanisms will be disengaged. Pressure plates 65, 66 are maintained out of contact with the casing by the spring clusters and accordingly the clutch mechanisms are inactive. The spaces 70, 71 indicate the inactive position of the pressure plates. Further, spaces 82, 83 as defined by the solid lines of FIGURE 3 will exist between the flats 74, 75 of spider arms and the opposed bearing faces of aperture 31.

Now, one of the factors that greatly influences the locking ability of this differential is the axial thrust forces generated within the differential. It is the resultant of these thrust forces acting upon a clutch pack that causes the differential to "lock up."

Thrust forces are developed in two locations, namely at the teeth of the thrust coupling 47 or 49 and at the point of tooth contact between the pinion gears 35 and their side gears 45, 46. The thrust force developed by the thrust coupling is several times greater than that produced by the pinions and side gears.

The pinion and side gears are straight bevel gears that produce a separating force as a result of tooth load. This separating force can be broken into two components, one acting away from the center of the differential along the axis of the pinion and the other acting away from the center of the differential in the direction of the side gear. It is the latter axial force that can influence the locking of the differential.

When torque is transmitted from the side gear or inner half of the thrust coupling to the outer half of the thrust coupling, an axial thrust directed inward is developed. This is the purpose of the thrust coupling, to develop a thrust force.

When both axles 53 and 54 have the same traction, the thrust forces generated within the differential are in balance and the only load on the clutch packs is the preload from the radially arranged springs 67 and 68.

The action of the floating spider 37 is best illustrated by comparing the thrust forces developed within the above described locking differential having a floating spider with a differential which does not include this feature.

Assume that the right hand axle shaft 54 attached to the right hand wheel has more traction than the left hand shaft 53 attached to the left hand wheel. In a locking design which does not include the floating spider, the differential may or may not lock up depending upon how large a difference in traction there exists between the left hand and right hand wheels. The differential without the floating spider requires a larger difference in traction conditions between the left hand and right hand wheels in order to lock up than does the differential with the floating spider. This is because, under the assumed conditions, the net axial thrust force acting on the left hand clutch pack 60 is greater with the floating spider design than with a differential which lacks the floating spider. If the thrust force on the left hand clutch pack is large enough it will lock up the differential by clutching the left hand side gear 45 to the differential case through pressure plate 65.

In a construction which does not include the floating spider, there is a spacer between the side gears. This spacer is free to move back and forth within the spider (the spider cannot move axially) and is the means of transmitting unbalanced thrust forces to the clutch packs. Under the assumed traction conditions, the right hand wheel, having more traction than the left hand, the thrust force developed by the right hand thrust coupling is greater than the thrust force developed by the left hand coupling. As a result, the right hand side gear or inner half of the right hand thrust coupling moves to the left and exerts a thrust through the spacer upon the left hand side gear which in turn is moved to the left and compresses the left hand clutch pack. However, when the right hand side gear 46 moves to the left, the clearance or backlash between the pinion gear teeth and the right hand side gear teeth is decreased and the point of tooth contact is shifted to the toe of the pinion gear. This is indicated at 85 on FIGURE 2.

When the left hand side gear 45 is moved to the left, the clearance or backlash between the meshing pinion teeth and the left hand side gear teeth is increased, and the point of tooth contact is shifted to the heel of the pinion gear. This is indicated at 86 on FIGURE 2.

Since the forces on the pinion gear 37 are in equilibrium, the product of the tangential force at the toe of the pinion gear on the right hand side, times its moment arm, is equal to the tangential force at the heel of the pinion gear on the left hand side, times its moment arm. Since these moment arms are unequal the tangential forces are unequal. The tangential forces are inversely proportional to the length of their moment arms, which means that the tangential force at the toe of the pinion gear is greater than the tangential force at the heel. As a result the axial thrust force at the toe of the pinion, pushing on the right hand side gear 46, is larger than the axle thrust force at the heel of the pinion pushing on the left hand side gear 45. The resultant of these two forces is a force directed to the right, opposing the force from the right hand thrust coupling and thereby reducing the force on the left hand clutch pack 60. By reducing the force on the left hand clutch pack, the locking ability of the differential is reduced.

To sum up, in a locking differential which does not include the floating spider concept, the resultant of the thrust forces from the tooth contact between the pinion and side gears is always in opposition to the thrust force from the thrust coupling that is acting to lock up the differential. This inherent fault reduces the locking ability of this differential.

With the floating spider design, the tooth contact between the pinion gear and side gears is always at the same point, namely, at the power transfer points 80, 81. When, as a result of unequal traction conditions, the thrust couplings 41, 40 produce an unbalanced axial thrust force causing the side gears to move in a given direction, the spider 37 and pinions 35 move with the side gears so that the point of tooth contact between these gears does not change. As a result, the thrust forces from tooth contact between the pinion gears and side gears are equal and in opposition to each other. The resultant of these forces is always zero and there is no resultant from these forces opposing the thrust force 84 from the thrust coupling acting to lock up the differential.

Specifically, the following will occur:

The existence of more traction associated with axle 54 than axle 53 will result in an inwardly directed thrust 84. This thrust will be transmitted from the outer half 50 of thrust coupling 49 to the inner half 46. Actually, the force transmitted will be due to the tendency of the teeth on outer coupling half 50 to cam or wedge inner half of side gear 46 toward the left as a result of the unbalanced thrust or torque on the axle 54.

The leftward directed thrust is transmitted from the side gear 46 to separator 39, thence through hub 36 of the spider 34, thence to separator 38 and thence to left side gear 45.

If the leftward directed thrust imposed on side gear 45 is greater than the force of the preloading springs 67, pressure plate 65 will be forced to the left and into engagement with the annular shoulder in casing 24. When the pressure plate 65 is pressed against casing 24, with sufficient force, rotation of side gear 45 with respect to casing 24 ceases and, since pinion gear assembly 33 rotates with the casing, the side gears 45 and 46 will be locked to one another. Power from drive pinion 12 will therefore be transmitted through the locked system to the wheel having greater traction.

Figure 2:
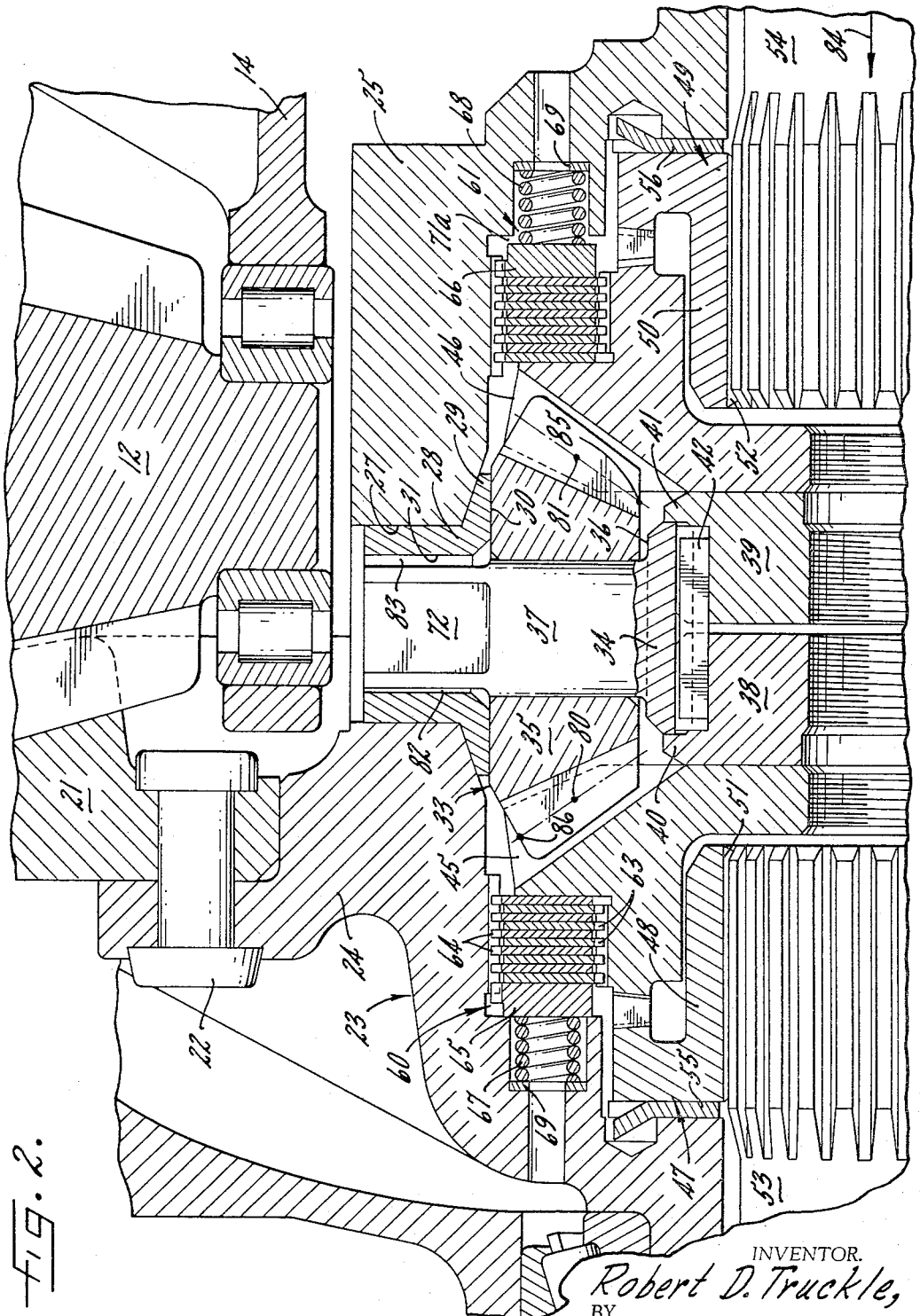
FIGURE 2 is a detailed view to an enlarged scale of a portion of FIGURE 1 and illustrating the differential in an activated condition.

The movement of the drive pinion assembly to the left will increase the gap 71 to the extent indicated at 71a in FIGURE 2, and will close the gap between pressure plate 65 and casing 24 altogether. At the same time the gap 74 will be narrowed, as indicated by the dotted line 74a in FIGURE 3, and gap 75 will be increased, as indicated by the dotted line 75a in FIGURE 3. The uppermost surfaces of the pinion gears 35 will therefore slide to the left with respect to the lower smooth faces 30 of the flanges 29 which form the bottom of each of the four inserts. Since the faces are smooth and this system is conventionally lubricated, the entire pinion and side gear assembly is free to slide or float backward and forward, depending upon which axle has greater traction.

Although the invention has been described in connection with its use in an automotive vehicle, it will at once be appreciated that the underlying concepts of the invention can be applied to other uses, and environments. Accordingly it is the intention that the scope of the invention be limited not by the scope of the foregoing exemplary description but solely by the scope of the hereafter appended claims.

I claim:

1. In combination in a differential,
a pair of thrust coupling assemblies,
a drive gear assembly comprising drive gearing carried by a supporting structure operatively located between said thrust coupling assemblies,
each thrust coupling assembly having a first member adapted for association with a driven member, and a second member in force transmitting engagement with said drive gear assembly,
said thrust coupling assemblies being coaxially disposed with one another,
structure limiting axial movement of the first members of the thrust coupling assemblies away from each other,
means for causing axial displacement of the second member of each thrust coupling assembly away from its associated first member in response to the imposition of a thrust on said first member from the driven member operatively associated therewith, and
structure for enabling the drive gearing and its associated supporting structure to be displaced in a direction parallel to the direction of movement of the second member of the thrust coupling assembly to which a thrust is applied,
whereby the applied thrust is applied to the other thrust coupling assembly in a direction to urge said other thrust coupling assembly into locking engagement with the axial movement limiting structure to thereby lock the thrust coupling assemblies to the axial movement limiting structure.

2. The differential of claim 1 further including
spacer means disposed in thrust transmitting operative engagement with the second members of the thrust coupling assemblies and the drive gearing supporting structure,
whereby thrust may be transmitted from one thrust coupling to the other substantially entirely through the drive gearing supporting structure.

3. The differential of claim 1 further including
a pair of clutch mechanisms,
each clutch mechanism being operatively disposed between the axial movement limiting structure and one of the second members of the thrust coupling assemblies,
said clutch mechanism being substantially inoperative when the opposed thrust forces in each thrust coupling assembly are substantially equal,
each clutch mechanism being operable to lock its associated thrust coupling assembly to the axial movement limiting structure upon application of an unbalanced thrust to the other thrust coupling assembly.

4. The differential of claim 1 further characterized in that
the structure for enabling the drive gearing and its associated supporting structure to be displaced included a plurality of mounting surfaces carried by the axial movement limiting structure,
said mounting surfaces being in sliding engagement with the drive gear assembly.

5. The differential of claim 4 further characterized in that the mounting surfaces of the axial movement limiting structure are in engagement with the drive gearing.

6. In a differential of the type having a pinion gear assembly carried by a differential casing for rotation therewith, a pair of side gears in engagement with the pinion gear assembly, and rotatable with respect to each other and to the casing, and means for connecting each side gear to an associated axle, the improvement comprising structure defining a slide way for the pinion gear assembly with respect to the casing in a direction perpendicular to the plane of rotation of the pinion gear assembly, and means enabling one side gear and the pinion gear assembly to be moved toward the other side gear in response to an unbalanced inward thrust on said one side gear in a direction parallel to the direction of movement of the pinion gear assembly, the other side gear, and the casing whereby the side gears may be locked to the casing and pinion gear assembly for rotation therewith.

7. The apparatus of claim 6 further characterized firstly, in that the pinion gear assembly includes a pinion gear carrier having a plurality of pinion gears mounted thereon for rotation with respect thereto, and secondly, that the side gears remain in engagement with the pinion gear carrier when the unbalanced inward thrust is directed through the pinion gear carrier and around the pinion gears.

8. The apparatus of claim 6 further including clutch means interposed between each side gear and the casing, each clutch means being effective, upon imposition of an unbalanced thrust of a predetermined magnitude to lock the side gear to the casing.

9. The apparatus of claim 6 further characterized in that, the pinion gear carrier has a plurality of outwardly extending members projecting into apertures in the casing, each said aperture being of greater length than the corresponding dimension of each outwardly extending member, whereby the carrier, and thereby the pinion gear are adapted for reciprocal movement in a direction substantially parallel to the axis of rotation of the pinion gear assembly.

10. The apparatus of claim 9 further characterized in that, said aperture includes an insert disposed therein, each said insert being of a length, in a direction perpendicular to the direction of movement of the side gear, equal to the corresponding dimension of each said outwardly extending member whereby movement of the carrier in said direction is prevented, each said insert being of a length in a direction parallel to the direction of movement of the side gear sufficient to enable the side gear opposed to the source of unbalanced thrust to be moved into locking engagement with the casing.

11. The apparatus of claim 9 further characterized in that, each said aperture is rectangular with an insert non-rotatably mounted therein, each said insert has a shank portion terminating at its radially innermost end in a flange and having a smooth undersurface which engages the pinion gears in slideable relation, each said insert has a generally rectangular shaped aperture formed therein and adapted to receive the outwardly extending members, each said outwardly extending member has two pairs of opposing flats forming one pair of side flats and one pair of end flats, said side flats being disposed in a plane substantially parallel to the axis of rotation of the thrust couplings and said end flats being disposed in a plane substantially perpendicular to the axis of rotation of the thrust couplings, and said side flats being spaced apart a distance approximately equal to the width of the generally rectangular aperture in the insert and said end flats being spaced apart a distance substantially less than the long dimension of the generally rectangular aperture allowing reciprocal movement of the pinion gear assembly in a direction substantially parallel to the axis of rotation of said thrust couplings.

References Cited

UNITED STATES PATENTS

| | | | |
|---|---|---|---|
| 2,720,796 | 10/1955 | Schou | 74—711 |
| 2,855,805 | 10/1958 | Fallon | 74—711 |
| 2,855,806 | 10/1958 | Fallon | 74—710.5 |
| 3,053,114 | 9/1962 | Singer | 74—711 |
| 3,264,901 | 8/1966 | Ferbitz et al. | 74—711 |
| 3,276,290 | 10/1966 | Randall | 74—711 |

FRED C. MATTERN, JR., *Primary Examiner.*

DAVID J. WILLIAMOWSKY, *Examiner.*

J. A. WONG, *Assistant Examiner.*